(No Model.)

M. C. & W. E. WHITWORTH.
TRANSPLANTER.

No. 518,657.

3 Sheets—Sheet 1.

Patented Apr. 24, 1894.

Witnesses
Harry D. Rohrer
G. Arthur Pennington

Inventors
Mal C. Whitworth and
William E. Whitworth
By L. S. Bacon
Attorney

THE NATIONAL LITHOGRAPHING COMPANY,
WASHINGTON, D. C.

(No Model.)  
3 Sheets—Sheet 2.
M. C. & W. E. WHITWORTH.
TRANSPLANTER.
No. 518,657. Patented Apr. 24, 1894.
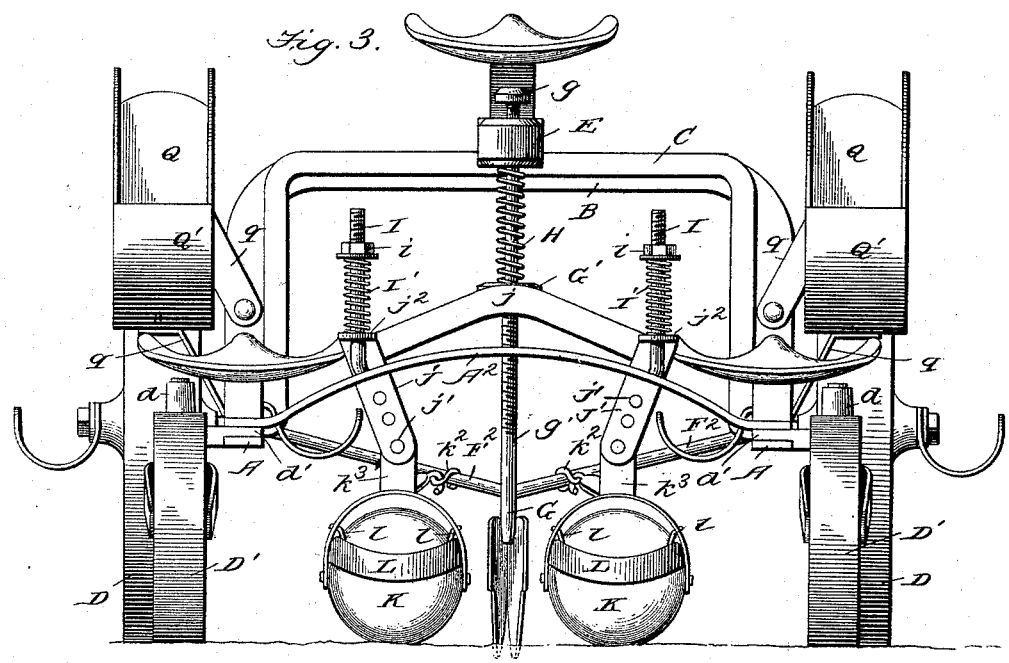
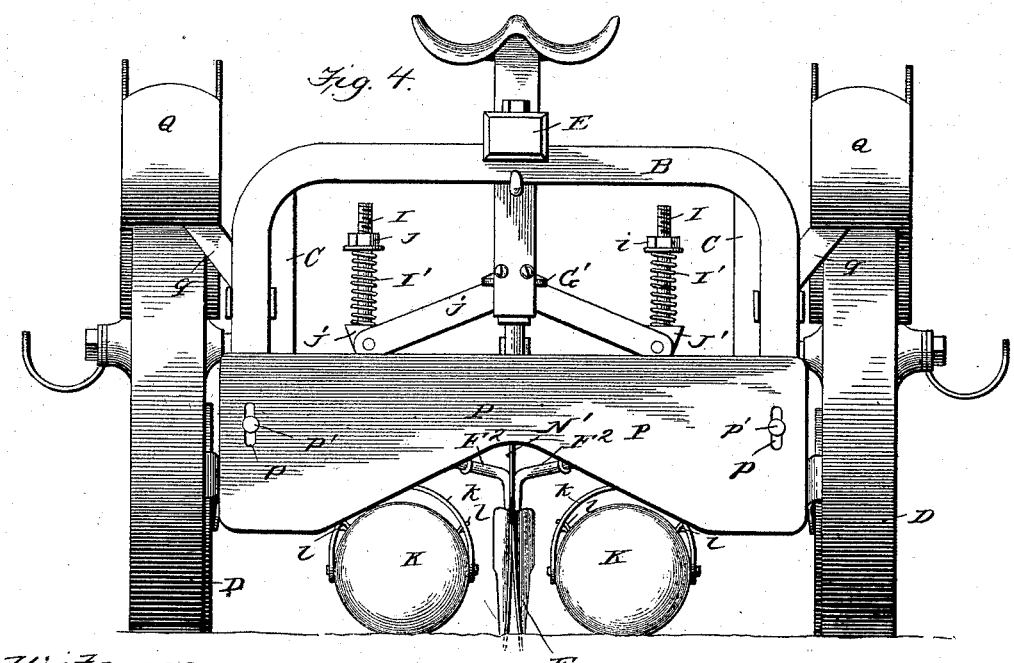

(No Model.)
M. C. & W. E. WHITWORTH.
TRANSPLANTER.
No. 518,657. Patented Apr. 24, 1894.
3 Sheets—Sheet 3.
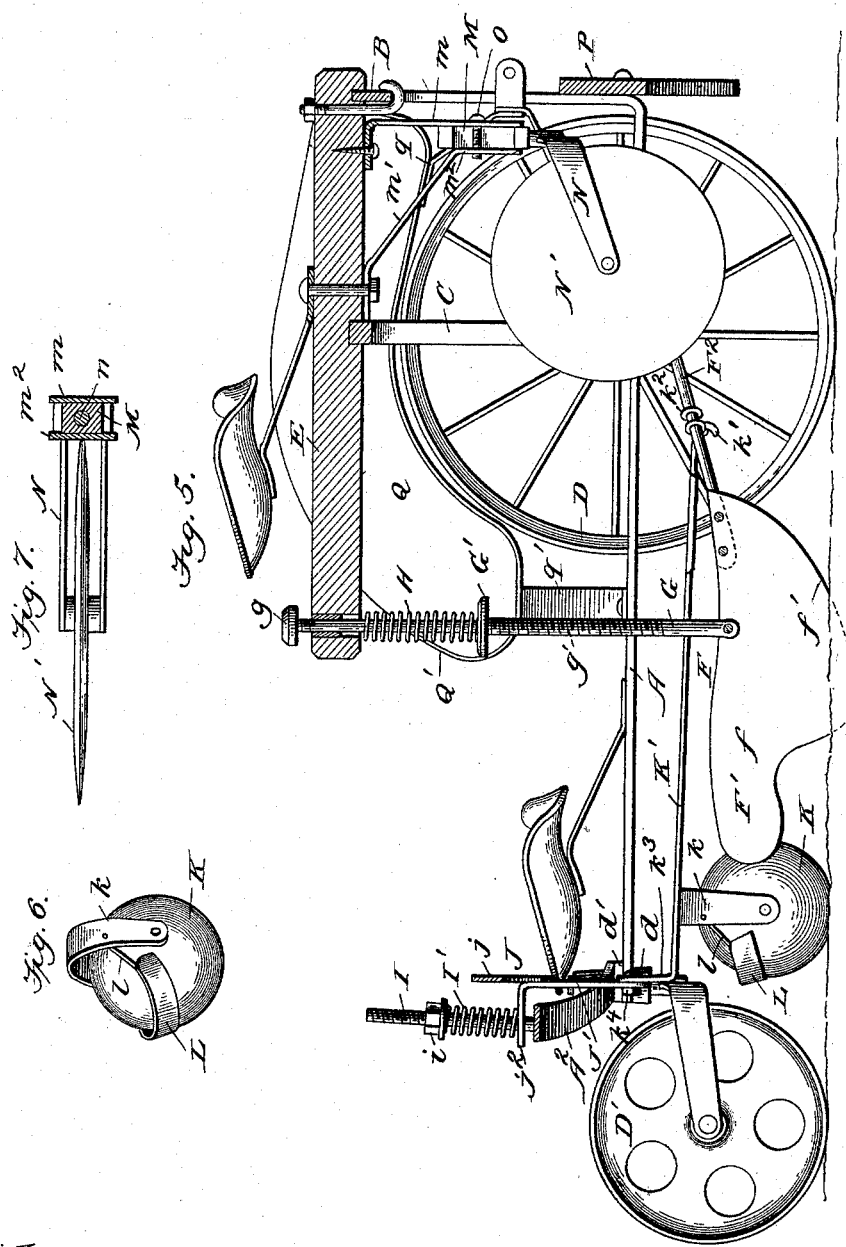
Witnesses
Harry D. Rohrer
G. Arthur Pennington
Inventors
Mal C. Whitworth &
William E. Whitworth
By L. S. Bacon
Attorney

UNITED STATES PATENT OFFICE.

MAL CHIGA WHITWORTH AND WILLIAM EDWARD WHITWORTH, OF DONELSON, TENNESSEE.

TRANSPLANTER.

SPECIFICATION forming part of Letters Patent No. 518,657, dated April 24, 1894.

Application filed November 27, 1893. Serial No. 492,158. (No model.)

*To all whom it may concern:*

Be it known that we, MAL CHIGA WHITWORTH and WILLIAM EDWARD WHITWORTH, citizens of the United States, residing at Donelson, in the county of Davidson and State of Tennessee, have invented certain new and useful Improvements in Transplanters; and we do hereby declare the following to be a full, clear, and exact description of the invention, such as will enable others skilled in the art to which it appertains to make and use the same.

This invention relates to an improvement in "transplanters" and it consists in the construction and arrangement of the parts hereinafter described and definitely pointed out in the claims.

The aim and purpose of the invention are the provision of an improved machine for transplanting potato, tobacco and other plants in a greatly facilitated manner, decreasing the amount of labor usually incident to that class of work, and at the same time properly embrace the plants in the soil, with dispatch and rapidity. These objects are attained by the construction illustrated in the accompanying drawings wherein like letters of reference indicate corresponding parts in the several views, and in which—

Figure 1:
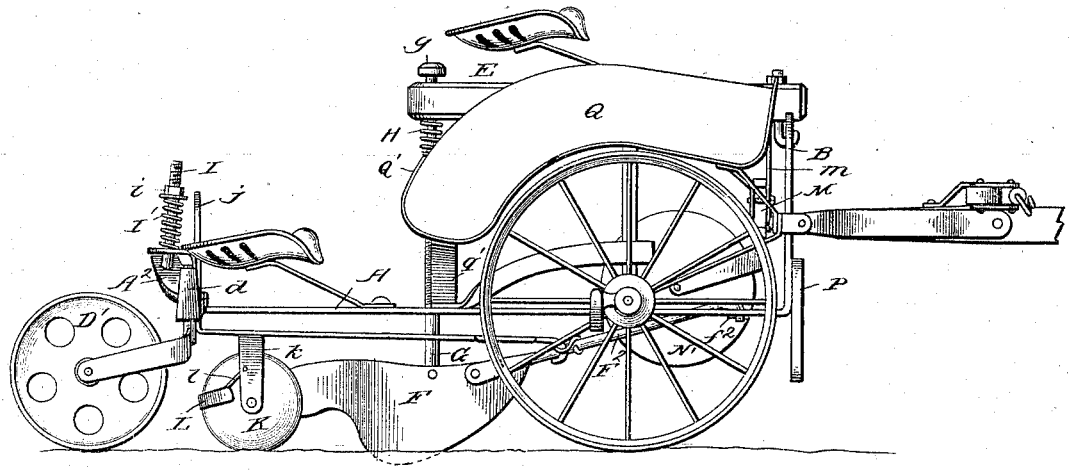
Figure 2:
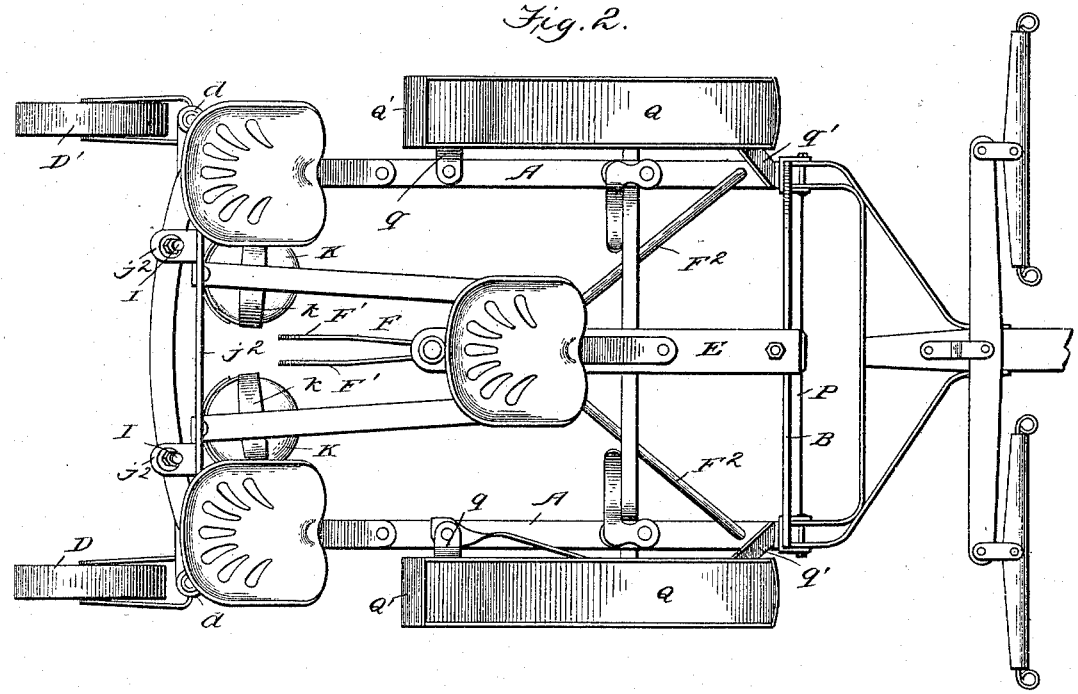

Figure 1 is a side elevation of the machine. Fig. 2 is a top plan view. Fig. 3 is a rear elevation. Fig. 4 is a front elevation. Fig. 5 is a longitudinal vertical section. Fig. 6 is a detail view of a roller, and Fig. 7 is a transverse section through the center support.

In the drawings A represents the side-bars of the frame having their forward ends connected by an arched cross-bar B forming continuations of the side-bars. On the upper faces of the side-bars is secured the shaft or axle C which is intermediately arched and carries on its outer ends the spindles on which the ground wheels D are mounted, which support the forward portion of the machine.

D' represents the caster wheels pivotally secured in vertical sockets $d$ secured to the rear ends of the side-bars. These sockets are formed on the outer ends of laterally extending arms $d'$ so that the caster wheels may be turned forward parallel with the side bars, when the machine is stored or packed for shipment, or in backing the machine if at any time it should be necessary.

Mounted on the upper portions of the front arch B and the arched axle or shaft C is the "tie-bar" or beam E, the same being rigidly secured to the arches, and extending from the arch B back to a point approximate the center of the machine, at which point a vertical aperture is formed therein.

F represents the opening or furrow plow consisting of two wings $f$ united at their forward ends and at that point constituting the penetrating or cutting edge. The wings diverge outwardly and extend downwardly as at $f'$ and at their upper rear ends have the apron extensions F' which serves to retain the plants in an upright position after depositing the same in the furrow and between the wings. The plow F has a curved cutting edge and is secured at its upper forward edge to the two plow-beams $F^2$ which extend laterally outward and forward at an incline, and have their forward ends bent down and passed through apertures or sockets in the forward ends of the side-bars A. Suitable keys $f^2$ are passed through the ends of the beams to retain them in their sockets. The sockets through which the ends of the beams pass are of a size sufficient to allow a limited vertical movement of the beams, so that the plow may be elevated or depressed when desired.

To adjust the plow, a vertical adjusting rod G is pivotally secured to and between the wings thereof at a point near their forward ends and extends upward to and through the aperture in the beam E. The upper end of the rod has a cap or nut $g$ for limiting its downward movement. The central portion of the rod is screw-threaded as $g'$ and on this threaded portion is a nut or disk G'. Above the disk G' is a spiral spring H sleeved on the rod, its upper end abutting against the under surface of the beam E, and its lower end resting on the disk G'. By adjusting the disk G' the spring pressure on the plow may be varied, so that an equal penetration may be had in different characters of soil, and also a variation in the penetration to suit different species of plants. By applying the spring pressure to the plow, we are enabled to form a practically regular furrow in ground having an uneven surface. The rear ends of the side-bars A are connected by the cross-bar $A^2$ which is slightly arched and has two posts I on opposite sides intermediate the ends and center.

J is a yoke having an arched cross-bar $j$ and downwardly extending and inwardly inclined arms J′ having two or more bolt holes $j'$ therein. On the ends of the bar $j$ are rearwardly extending flanges $j^2$ having slots therein through which the posts I pass. Sleeved on the posts I above the flanges $j^2$ are springs I′ their lower ends resting on the flanges and their upper ends abutting against the nuts $i$ meshing with the screw-threads on the posts. By adjusting the nuts $i$ up or down the tension of the springs may be varied to vary the down pressure on the yoke.

K represents two spherical rollers journaled in U-shaped frames $k$ which are secured at their upper central portions to the bars K′. These bars K′ are of a length sufficient to carry their forward ends in proximity to the plow beams, and at that point have the hooks $k'$ formed thereon, which engage with clevises $k^2$ secured on the beam. The rear ends of the bars K′ are upturned forming flanges $k^3$ at points in the rear of the rollers. Suitable apertures are formed in the ends $k^3$ through which bolts $k^4$ pass the same passing through one of the apertures in the arms J′, preferably through the upper apertures when the soil is ridged and in the lower apertures when the soil is level, thereby constituting an adjustable connection. The rollers are held in oppositely inclined positions and the inclination may be altered by virtue of the connections between the inclined arms J′ and the flanges $k^3$ thereby forming the ridges or hills about the row of plants, the springs on the posts exerting the requisite pressure on the rollers.

We have found that the use of spherical rollers result in much better packing of the soil, and ridging of the same about the plants, especially on level ground than other forms. Again these spherical rollers are interchangable should one side become worn, each fitting on either side.

To clean the earth from the rolls, we secure the semi-circular scrapers L to the frames $k$ by the spring arms $l$ secured to the ends of the scrapers and extending back to and through suitable apertures formed in the frame. The scrapers normally rest on the rolls and peel or scrape off all matter adhering thereto.

It is evident that cylindrical rolls can be used with soil of certain character, but the spherical rolls we regard as an important feature of the invention.

On the under side of the beam E at its front is a bracket consisting of the vertical plate $m$ and the inclined plate $m'$ having the parallel vertical portion $m^2$ at its lower end.

Between the parallel portion is an I-shaped block M having a central vertical socket therein in which the shank $n$ of a cutter carrier N is pivotally secured.

The cutting wheel or colter N′ consists of a large disk having a cutting edge and is located directly in front of the plow, for the purpose of cutting all weeds or foreign matter that may be on the surface in the path of the plow. To adjust this cutter suitable bolts $o$ are passed through the plates $m$ $m'$ between the projections on the block M. By tightening the bolts the block is held firmly in place; the projection on the block limiting its movement and preventing its accidental detachment should the bolts become loose.

P is a leveling board adjustably secured to the front face of the vertical ends of the cross-bar by having elongated slots $p$ formed therein through which suitable bolts $p'$ pass. The purpose of this board is for leveling the ground in advance of the plow, and the same has the V-shaped recess in its lower edge to level or fit a ridge.

Q are the plant boxes curved to correspond to the curvature of the ground wheels above which they are placed, the same being held fixedly in position by the supports $q$ $q'$ at front and rear, the supports having their lower ends secured to the frame and front cross bar respectively. The boxes have open tops and the base is carried up over a portion of the rear of the tops as at Q′ to prevent the plants from falling from the boxes. By forming the boxes in a curve and placing them over the wheels they are so located as not to interfere with the operation of the machine and are in convenient reach of the operators, at the same time a large number of plants can be packed therein.

R represents the operators' seats located in the rear of the boxes on the side-bars.

R′ is the driver's seat located on the beam E.

Suitable feet rests S for the operators are secured on opposite sides of the ground wheels.

To indicate the periods in which the plants are to be deposited we secure a metallic spring T on a side bar A, its forward end projecting up and out, and in the path of the spokes of the wheel so that as the wheel revolves the spokes force the end of the spring in and as the spoke passes the same it will quickly spring back striking the following spoke and "click" or audibly indicate the interval for deposit.

In operating the above described machine the plants being placed in the boxes are taken therefrom and placed separately between the wings of the plow as the machine is advanced. The plants are held in their upright positions by the extension on the rear of the wings, which project back to a point directly in front of rollers. The rollers being placed at an incline force the soil up against the plants and pack the same. The tension of the spring on the yoke being regulated to exert the requisite pressure on the rollers so that the plants will be snugly but not overpacked.

When the plants are to be thickly planted two operators may occupy the machine, alternating in placing the plants between the wings, but where the plants are to be placed at a distance apart, one operator will suffice.

Any desired form of draft attachment may be employed.

We are aware that many minor changes in the construction and arrangement of the parts of the machine can be made and substituted for those herein shown and described without in the least departing from the nature and principle of our invention.

Having thus described the invention, what we claim as new, and desire to secure by Letters Patent, is—

1. In a plant transplanter, the combination with a frame composed of side and end crossbars, of an opening plow centrally located between the side bars, beams extending diagonally from the plow to the frame, and loosely secured at their forward ends, a spring-pressed rod on the plow, and laterally and vertically adjustable rollers on opposite sides and in the rear of the plow, substantially as described.

2. In a plant transplanter, the combination with a surrounding frame, of an opening plow consisting of two outwardly inclined wings below the frame, a fixed beam above the plow, oppositely diverging plow beams, rollers in the rear of the plow and on opposite sides thereof, frames in which the rollers are mounted, extensions on the roller frames loosely connected to the plow beams and adjustable spring-pressed connections between the plow frame and rear of the roller beams, substantially as described.

3. In a transplanter, a yoke having downwardly and inwardly inclined ends, in combination with the frame supporting the same, and rollers adjustably secured on the inclined ends of the yoke, substantially as described.

4. In a transplanter, the combination with a frame, of inclined supports thereon, and rollers adjustably secured to the supports, and adapted to be adjusted vertically and laterally thereon substantially as described.

5. In a transplanter, the combination with the frame, of movable inclined supports thereon, springs engaging the supports, and rollers adjustably secured to the supports, and having vertical and lateral adjustments thereon substantially as described.

6. In a transplanter, the combination with a frame, of a spring-pressed support, rollers on the support, and an opening plow, having plant supporting extensions carried back between the rollers substantially as described.

7. In a transplanter, the combination with the frame, of a plow, a colter, a sliding block in which the colter is pivoted, suspending plates on the frame between which the block is placed and bolts passing through the plate on opposite sides of the block, substantially as described.

8. In a transplanter, the combination with a frame having an arched cross-bar at its front, of an adjustable leveling board extending directly across the frame and adjustably secured at opposite ends to the vertical portions of cross-bar, substantially as described.

9. In a transplanter, the combination with the wheels, of curved plant receptacles located over the wheels, and seats adjacent to the receptacles, substantially as described.

10. In a transplanter, the combination with the wheels, of plant receptacles located above and extending downward in the rear thereof, substantially as described.

In testimony whereof we affix our signatures in presence of two witnesses.

MAL CHIGA WHITWORTH.
WILLIAM EDWARD WHITWORTH.

Witnesses:
W. B. BALLARD,
J. P. WILLIAMSON.